US006939051B2

(12) United States Patent
Elmgren et al.

(10) Patent No.: US 6,939,051 B2
(45) Date of Patent: Sep. 6, 2005

(54) BEARING ARRANGEMENT FOR A SHAFT

(75) Inventors: Stefan Elmgren, Göteborg (SE); Folke Östling, Göteborg (SE); Lars Andrén, Sjövik (SE)

(73) Assignee: SKF Sverige AB, Gothenburg (SE)

( * ) Notice: Subject to any disclaimer, the term of this patent is extended or adjusted under 35 U.S.C. 154(b) by 72 days.

(21) Appl. No.: 10/311,697

(22) PCT Filed: May 16, 2001

(86) PCT No.: PCT/SE01/01082

§ 371 (c)(1),
(2), (4) Date: Aug. 1, 2003

(87) PCT Pub. No.: WO01/88396

PCT Pub. Date: Nov. 22, 2001

(65) Prior Publication Data

US 2004/0101220 A1 May 27, 2004

(30) Foreign Application Priority Data

May 18, 2000 (SE) ............................................. 0001869

(51) Int. Cl.[7] ............................ F16C 33/72; F16J 15/52
(52) U.S. Cl. ........................ 384/477; 384/480; 277/392
(58) Field of Search ................................ 384/477, 478, 384/480; 277/389, 391, 392; 464/79

(56) References Cited

U.S. PATENT DOCUMENTS 5,894,789 A * 4/1999 Huber ........................... 100/4
6,644,430 B2 * 11/2003 Harer et al. ................ 277/586

FOREIGN PATENT DOCUMENTS

EP 0 291 104 A1 11/1988
EP 0 394 683 A1 10/1990
EP 0 677 686 A1 10/1995

* cited by examiner

*Primary Examiner*—Thomas R. Hannon
(74) *Attorney, Agent, or Firm*—Burns, Doane, Swecker & Mathis, LLP

(57) ABSTRACT

A bearing arrangement supporting a sealing bellows around a shaft to permit axial and angular motion includes inner and outer bearing sleeves, and a rolling bearing having an inner race ring fitted around the inner sleeve with one end face engaging a shoulder in the inner sleeve. A sealing device is provided in a space between the inner and outer sleeves. A flexible elongated bellows for enclosing a portion of the shaft is sealingly connected at one end to the outer surface of the outer sleeve and is attachable at its opposite end to a fitting of a machine member from which the shaft projects. The outer sleeve is a sheet metal sleeve provided with an inwardly bent flange portion forming an engagement surface for the opposite side face of the rolling bearing. The bellows is fixedly attachable to the outer surface of the outer sleeve by bonding through vulcanization.

20 Claims, 2 Drawing Sheets

BEARING ARRANGEMENT FOR A SHAFT

The present invention refers to a bearing arrangement for supporting a sealing bellows around a shaft in a manner permitting axial motion and angular misalignment of the shaft. An application for such a bearing arrangement can be for the protective bellows enclosing a main shaft of a water jet vehicle, although it is not limited thereto.

For that and similar applications is earlier known bearing arrangements for supporting such a bellows around a shaft in a manner permitting axial motion, and incorporating a first, inner bearing sleeve, a rolling bearing fitted with its inner race ring around said first sleeve and with one end face engaging a shoulder in the inner sleeve, and a second, outer bearing sleeve, sealing means provided in a space between said first and second bearing sleeves beside the rolling bearing, and a flexible elongated bellows intended to enclose a portion of the shaft and sealingly connected at one of its ends to the outer envelope surface of the second, outer bearing sleeve, and having means for attachment of its opposite end to a fitting of a machine member from which the shaft projects.

Such bearing arrangements have earlier been made with especially designed bearings, and these arrangements have therefore been expensive and they have furthermore been time-consuming to mount due to several separate elements, and finally the sealing function has not always been sufficient, probably due to incorrect mounting operations.

A bearing application like this, especially for a water jet vehicle must be well sealed off and reliable at the same time as the seal must be designed in such a manner that it does not prevent the axial and angular mobility of the components. Another purpose of the invention is to provide a very simple, inexpensive and yet reliable machine element, which also shall be easy to handle, and these purposes have been met, with a bearing arrangement in accordance with the contents of the annexed claims.

Hereinafter the invention will be described with reference to embodiments illustrated in the accompanying drawings.

Components which are identical in the different embodiments have been given the same reference numbers.

Figure 1:
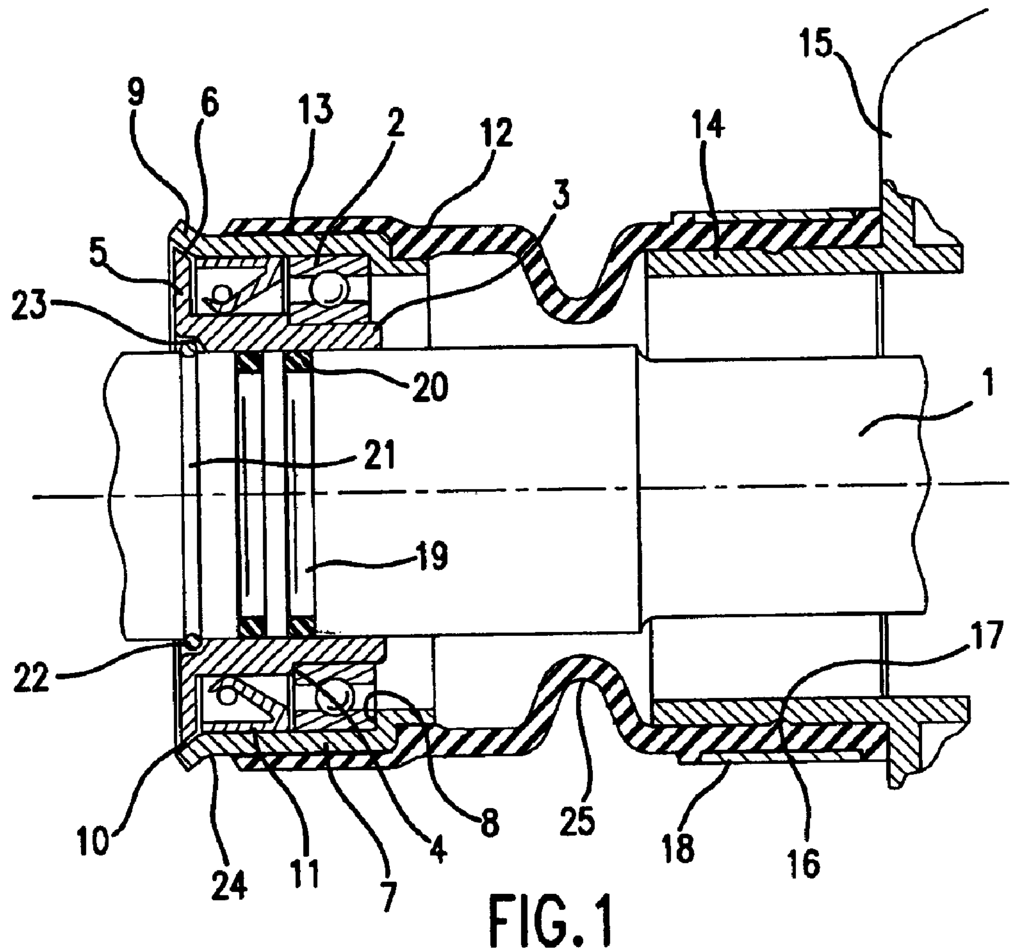
FIG. 1 shows in a longitudinal cross section a portion of a shaft supported in a ball bearing arranged in a housing.

The bearing arrangement as shown in FIG. 1, is provided at a rotating shaft 1, and incorporates a standard ball bearing 2, having its inner race ring fitted in a first sleeve 3, which could be arranged with a sliding fit on the shaft 1, and which in its outer envelope surface has a shoulder 4 against which the inner race ring of the bearing 2 engages. The first sleeve 3 further has a flange 5 extending radially outwards and having at its external end a chamfer 6. The outer race ring of the bearing 2 is fitted in a second sleeve 7, which has an internal shoulder 8, forming an axial stop for the outer bearing race ring. At its end opposed from the bearing this second sleeve 7 has an obliquely outwardly bent portion 9, situated in level with the chamfer 6 of the first sleeve and forming together with this chamfer a labyrinth seal 10. Between the bearing 2 and said labyrinth seal 10, the first and second sleeves 3, 7 enclose a space in which is provided a conventional contact seal 11 slidingly contacting the fist sleeve 3. One end portion of a flexible bellows 12 is fixedly attached about a major axial part of the second sleeve 7 by means of vulcanisation 13. The bearing sleeves are preferably case deep pressed, but they may also be made from plastic material or the like. The first sleeve flange 5 is further acting as a centrifugal flinger, which via the chamfer 6 has a tendency of pumping water in a direction out from the bearing during operation. Furthermore it has a function as a mechanical protection for the conventional seal 11 positioned inside the labyrinth seal 10. However, the upwardly bent portion 9 of the outer sleeve member 7 is positioned axially outside the side face of the radial flange (5) for improving the drainage effect.

The opposite end of the bellows 12, which preferably is a rubber tube, is fitted about a circular flange 14 of a housing 15, e.g. an engine housing or the like. This end of the bellows 12 is fitted to the flange 14 with a circumferential bead 16 in the inner surface of the bellows, which is received in a groove 17 in the flange 14. A hose clamp 18 of any known type is further used to secure the end of the bellows 12 to the flange 14.

In the area of the first sleeve 3 the shaft 1 is provided with circumferential grooves 19, in which is arranged O-ring seals 20 for preventing water from penetrating along the shaft 1 and into the motor housing 15. Furthermore the shaft 1 is provided with a further groove 21 in which is provided a locking ring 22 forming a stop for axial movement in one direction, thereby co-operating with a circumferential recess 23 at one inner end edge of the first sleeve 3.

The end of the bellows 12, bonded to the outer envelope second sleeve 7 terminates with an inclined end, which together with the outwardly bent portion 9 of the second sleeve 7 forms a circumferential gutter 24 near the end of the second sleeve 7 facing away from the motor housing. This gutter collects water and moisture on the outer envelope surface of the bellows 12 and drains it at the lower side, thereby preventing it from entering the adjacent labyrinth seal 10.

In this embodiment of the invention the first and second sleeve 3, 7 with seals 6, 11, bearing 2 form together a united machine component, which can be delivered from the manufacturer to the end user as a unit. The only operation needed at mounting is to connect the bellows to the unit and to push up the unit over the shaft 1, thereby ascertaining that the bellows 12 is compressed axially so much that its wave-formed portion 25 is biased to urge the first sleeve 3 towards its axial stop formed by the locking ring 22, via the intermediary of the bellows 12, the outer sleeve 7, and the bearing 2. In this embodiment the bellows 12 might also form an integral part of the unit, which thus can be delivered from the manufacturer having the bellows 12 bonded, glued or affixed in any other appropriate manner to the second, outer sleeve 7.

The main purpose of the rolling bearing 2 thus is to hold the rubber bellows 12 and the seals 10 and 11 in place, whereas the rubber bellows transfers the friction torque generated by bearing and seal.

Figure 2:
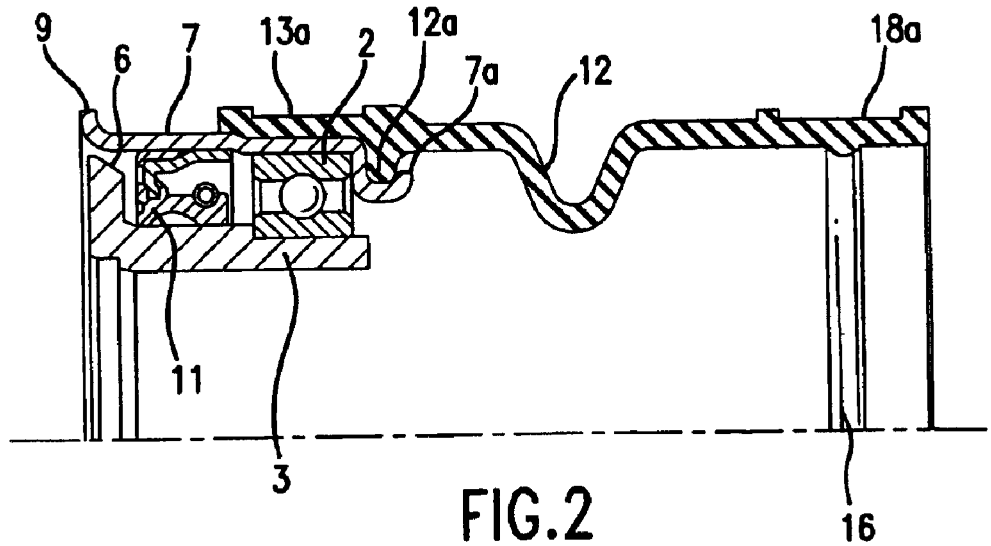
FIG. 2 is a second embodiment of a bearing arrangement according to the invention shown in cross section and only the upper half of the arrangement.

FIG. 2 shows a longitudinal section through a modified embodiment of the bearing arrangement according to the invention, whereby only the upper half of the arrangement is shown and without housing and shaft.

In this embodiment there is thus a rolling bearing 2 having its inner race ring mounted on a first sleeve 3, which is arranged to receive a not shown shaft with a sliding fit, and which in its outer envelope surface has a shoulder against which the inner race ring of the bearing 2 engages. Furthermore the first sleeve 3 has a radially outwardly extending flange 5, which at its external end has a chamfer 6. The outer race ring of the bearing 2 is fitted in a second sleeve 7, which has an internal shoulder, forming an axial stop for the outer bearing race ring. At its end opposed from the bearing this second sleeve 7 has an obliquely outwardly bent portion 9, situated in level with the chamfer 6 of the first sleeve and forming together with this chamfer a labyrinth seal. Between the bearing 2 and said labyrinth seal, the first and second sleeves 3, 7 enclose a space in which is provided a conventional contact seal 11, slidingly contacting the first sleeve 3. One end portion of a flexible bellows 12 is fixedly attached about a major axial part of the second sleeve 7 by means of a not shown hose clamp intended to be positioned in a shallow groove 13*a* in the outer surface of the bellows. This hose clamp thereby replaces the vulcanization between the second sleeve 7 and the bellows, used in the embodiment according to FIG. 1. The opposite end of the bellows is intended to be fitted to a not shown casing via a further hose clamp (not shown) intended to be fitted in an external, circumferential, shallow groove 18*a,* and internally the bellows is also equipped with a circumferential bead 16 intended to fit in an external groove in said not shown casing.

The omission of the vulcanized joint between the second sleeve 7 and the bellows 12 simplifies the attachment and makes possible later exchange of parts of the bearing assembly without damaging the components thereof. In order to ascertain that the bellows shall not slide on the sleeve 7 if the grip between the second sleeve 7 and the bellows 12 caused by the hose clamp, for some reason should become too loose, the end edge 7*a* of the second sleeve 7 is bent up and an inward ridge 12*a* on the bellows is arranged to be inserted with snap-action in the groove formed by the up-bent end edge 7*a.*

Figure 3:
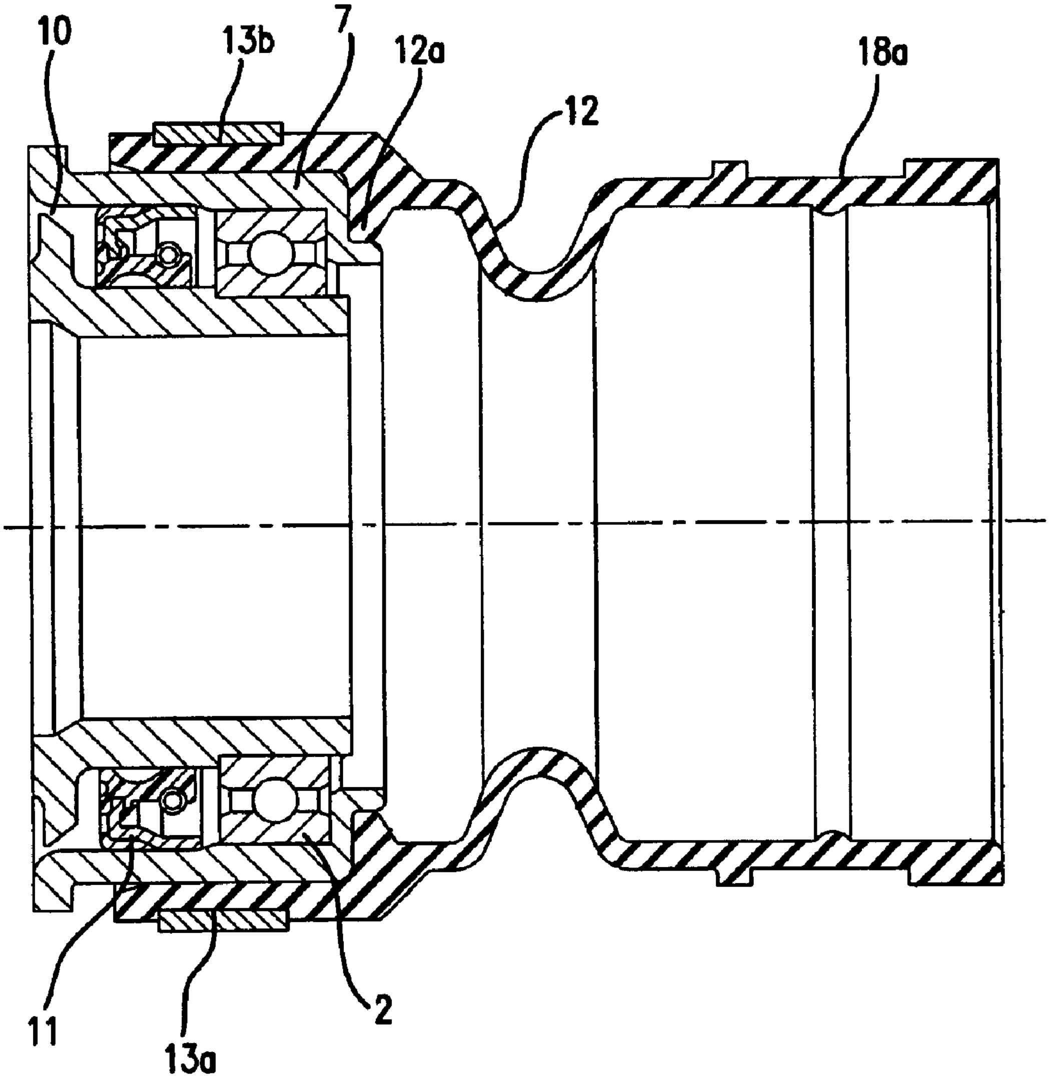
FIG. 3 is a third embodiment of the bearing arrangement in a longitudinal cross section.

In FIG. 3 is shown a further embodiment of the bearing arrangement according to the invention, and this figure shows a longitudinal section through the arrangement but without shaft and parts of the housing to which the bellows shall be attached.

The bellows 12 has two external grooves 13*a* and 18*a* for hose clamps, one of which is shown at 13*b*. This hose clamp clamps a portion of the bellows 12 about the second sleeve 7, which is shaped substantially as the second sleeve 7 in the embodiment according to FIG. 1. The second sleeve 7 co-operates with a first sleeve 3 and forms together with this spaces for receiving a bearing 2 and a conventional sealing arrangement 11. Together the two sleeves form a labyrinth seal 10 situated outside the conventional seal 11. The main difference between the embodiments of the invention shown in FIG. 2 and in FIG. 3 is that the FIG. 3 embodiment is slightly simplified in that the outer sleeve 7 has no bent up portion (7*a* in FIG. 2) enclosing the inwardly extending ridge on the bellows.

By the design given to the arrangement according to the invention, it has been possible to use standard bearing and standard seal, which results in a substantial cost reduction as compared to earlier solutions.

The invention is not limited to the embodiment described and illustrated in the accompanying drawing, but modifications and variations can be made within the scope of the accompanying claims, and it can also be used for other applications than that described, such at in land vehicles, water vehicles, air vehicles an machinery in general, where a bearing arrangement for a bellows-enclosed shaft is required.

What is claimed is:

1. A bearing arrangement for supporting a sealing bellows around a shaft in a manner permitting axial and angular motion, comprising: a first inner bearing sleeve, a rolling bearing having an inner race ring fitted around said first sleeve with one end face of the rolling bearing engaging a shoulder in the inner sleeve, a second outer bearing sleeve, sealing means provided in a space between said first and second bearing sleeves beside the rolling bearing, and a flexible elongated bellows intended to enclose a portion of a shaft and sealingly connected at one of its ends to an outer surface of the outer bearing sleeve, and having means for attachment of its opposite end to a fitting of a machine member from which the shaft projects, the outer bearing sleeve being provided with an inwardly bent flange portion forming an engagement surface for an opposite end face of the rolling bearing, the bellows being attachable to the outer sleeve, the inner and outer bearing sleeves, the bearing and the sealing means thereby forming a united machine member.

2. A bearing arrangement as claimed in claim 1, wherein the bellows forms part of the united machine member.

3. A bearing arrangement as claimed in claim 1, wherein ends of the first sleeve and of the second sleeve facing away from the bellows are arranged to form a labyrinth seal between them.

4. A bearing arrangement as claimed in claim 1, wherein the first and second sleeve are arranged to form a labyrinth seal between them, and the sealing means comprises a contact seal provided between the labyrinth seal and the rolling bearing.

5. A bearing arrangement as claimed in claim 1, wherein the second sleeve at its end facing away from the bellows is provided with an obliquely upwardly bent portion, which together with a recess at an adjacent end of the bellows forms a circumferential gutter for collecting and draining water and moisture from the outer surface of the second sleeve and the bellows.

6. A bearing arrangement as claimed in claim 5, wherein the inner bearing sleeve has a radially extending flange forming, together with the upwardly bent portion of the outer bearing sleeve, a labyrinth seal, the upwardly bent portion being positioned axially outside a side face of the radially extending flange for drainage purposes.

7. A bearing arrangement as claimed in claim 6, wherein the radially extending flange of the inner sleeve member is designed as a finger giving a centrifugal pumping effect at rotation of the inner sleeve and also acting as a mechanical protection for a contact seal positioned between the said flange and the bearing.

8. A bearing arrangement as claimed in claim 1, wherein the bellows is fixedly attached to the second outer sleeve by being bonded to the outer surface of the second outer sleeve by vulcanization.

9. A bearing arrangement as claimed in claim 1, wherein the bellows is detachably attached to the second outer sleeve by at least one hose clamp.

10. Use of a bearing arrangement as claimed in claim 1 in which the shaft is a main shaft of a jet-ski vehicle, wherein a free end of the bellows is fitted to a flange fitting of a motor housing of the jet-ski vehicle.

11. A bearing arrangement mounted with respect to a shaft projecting from a machine member, comprising:

an inner bearing sleeve positioned around the shaft, the inner bearing sleeve including a shoulder;

an outer bearing sleeve positioned outwardly of the inner bearing sleeve with a space between the inner and outer bearing sleeves;

a rolling bearing located between the inner and outer bearing sleeves, the rolling bearing having an inner race ring fitted around the inner bearing sleeve, the rolling bearing having first and second end faces at opposite ends of the rolling bearing, the first end face of the rolling bearing engaging the shoulder of the inner bearing;

a seal provided in the space between the inner and outer bearing sleeves at a position axially adjacent the rolling bearing;

a flexible bellows enclosing a portion of the shaft, the bellows having oppositely located first and second end portions, the first end portion of the bellows being sealingly connected to an outer surface of the outer bearing sleeve;

means for attaching the second end portion of the bellows to the machine member;

the outer bearing sleeve including an inwardly extending portion forming an engagement surface engaging the second end face of the rolling bearing; and the inner and outer bearing sleeves together with the rolling bearing and the seal forming a united machine member.

12. A bearing arrangement as claimed in claim 11, wherein the bellows forms part of the united machine member.

13. A bearing arrangement as claimed in claim 11, wherein the inner bearing sleeve and the outer bearing sleeve each have an end facing away from the bellows, with a labyrinth seal being formed between said ends of the inner and outer bearing sleeves.

14. A bearing arrangement as claimed in claim 11, wherein the inner and outer bearing sleeves are arranged so that a labyrinth seal is formed between the inner and outer bearing sleeves.

15. A bearing arrangement as claimed in claim 14, wherein the seal comprises a contact seal provided between the labyrinth seal and the rolling bearing.

16. A bearing arrangement as claimed in claim 14, wherein an end of the outer bearing sleeve is provided with an obliquely upwardly bent portion, an end of the bellows located closest to said end of the outer bearing sleeve being provided with a recess which together with the bent portion forms a circumferential gutter for collecting and draining water and moisture from the outer surface of the outer bearing sleeve and the bellows.

17. A bearing arrangement as claimed in claim 16, wherein the labyrinth seal is formed by a radial flange of the inner bearing sleeve and the upwardly bent portion of the outer bearing sleeve, the upwardly bent portion being positioned axially outside a side face of the radial flange.

18. A bearing arrangement as claimed in claim 17, wherein the radial flange of the inner bearing sleeve forms a finger providing a centrifugal pumping effect upon rotation of the inner bearing sleeve while also acting as a mechanical protection for the seal, wherein the seal comprises a contact seal positioned between the radial flange and the rolling bearing.

19. A bearing arrangement as claimed in claim 11, wherein the bellows is bonded to the outer surface of the outer bearing sleeve by vulcanization.

20. A bearing arrangement as claimed in claim 11, wherein the bellows is detachably attached to the outer bearing sleeve by at least one clamp.

* * * * *